Patented July 18, 1950

2,515,672

UNITED STATES PATENT OFFICE 2,515,672

HEAT TRANSFER

Frank J. Sowa, Cranford, N. J.

No Drawing. Application July 25, 1945,
Serial No. 607,097

5 Claims. (Cl. 252—78)

This invention relates in general to heat transfer and in particular to a heat transfer fluid and to a process for heating with such fluid. At the present time there are four major fluids used in heat transfer. These are (a) steam; (b) petroleum oils; (c) mercury and (d) synthetic organic compounds. Steam is limited to temperatures below 450° F. because of the high pressure of water vapor which is developed above that temperature. Steam has the further disadvantage of producing scale and promoting the oxidation of metals used in the heat transfer system. Certain petroleum oils have been employed in heat transfer but these are generally limited to use at temperatures below 400° F. because they tend to carbonize and deposit sludge at higher temperatures. Moreover, natural oils show a wide variation in viscosity with slight change in temperature. Mercury is expensive and toxic and because of its high specific gravity, it has a tendency to be lost from any but a completely closed system.

Certain synthetic organic compounds, such as a mixture of diphenyl and diphenyl oxide have been employed in heat transfer but these compounds are useful only in a narrow range of temperatures and they have the very great disadvantage of being inflammable. There is a great need, however, for a heat transfer fluid which is free from the disadvantages of known fluids and which, in particular, can be operated safely and without change over a wide temperature range from 70° F. to 750° F. as both liquid and vapor. Moreover, it is desirable that the fluids show a relatively small change in viscosity over a wide temperature and pressure range and that it be non-toxic, non-corrosive and non-inflammable.

Therefore, it is a general object of the present invention to provide a heat transfer fluid which is free from the disadvantage of prior fluids.

It is a further objects of the invention to provide a heat transfer fluid which possesses the desirable characteristics.

It is a specific object of the invention to provide a process and heat transfer over a wide temperature range without substantial variation in operating conditions.

Other objects of tht invention will in part be obvious and will in part appear hereinafter.

According to the present invention, there is provided a process for heat transfer comprising heating or cooling a non-hydrolysable liquid organo-silicon compound and bringing the hot or cold liquid into heat exchange relation while it is still in the liquid state, while in another embodiment the liquid organo-silicon compound is first vaporized and the vapor brought into heat exchange relation with another fluid whereupon the organo-silicon compound is condensed to a liquid and the liquid is returned to be revaporized in a closed system. The process may be used for refrigeration or for heating.

For the heat exchange fluid of the present invention there is employed a non-hydrolysable organo-silicon compound selected from the group consisting of tetra alkyl silanes, mono- fluoroalkyl silanes in which the sum of the carbon atoms in the alkyl group exceeds 7, tri-alkyl silanols, alkyl silicyl ethers, di- and tri-alkyl silicon hydrides, and di-alkyl siloxanes, in which alkyl is straight chain aliphatic group.

Except for the fluorides, there may be given by way of example of the other classes the simple lower aliphatic derivatives such as methyl, ethyl, propyl, butyl and the like. Of the fluorides, there may be given by way of example monofluoro tributyl silane, monofluoro triamyl silane, difluoro diamyl silane and the like.

It is to be understood that the liquid organosilicon compounds may be used alone or in admixture with each other or in admixture with organic liquids of high boiling point such as higher boiling petroleum oils, diphenyl oxide, and the like, whenever they are compatible, for example, there may be used a mixture of diphenyl and tetra butyl silane, a mixture of diphenyl oxide and triamyl silanol, a mixture comprising diphenyl, diphenyl oxide and monofluoro tripropyl silane.

The non-hydrolysable organo-silicon compounds of the classes specified are particularly adaptable for heat exchange fluids, and when so used they exhibit new and unobvious characteristics; (a) in particular the present heat exchange fluids are characterized by operating successfully over a wide temperature range of from 60° below 0° F. to 700° F.; they may be used for refrigeration as well as heating; (b) the present fluids are thermally stable at all temperatures within such range; (c) the present fluids are stable over long periods of duration, that is, for periods much longer than for diphenyl and diphenyl oxide when used alone; (d) they exhibit a relatively small change in viscosity over the temperature range specified in; (e) they are substantially non-toxic and in general non-corrosive to metals used in heat exchange systems and also non-inflammable. Accordingly, the present invention provides, for the first time, a process for heat exchange which is free from the disadvantages of prior processes.

Moreover, because of the low vapor pressure of the present fluids, the non-hydrolysable orgona-silicon compounds may be used in open heat exchange systems, that is where there is a free surface of liquid in contact with the atmosphere. This is not possible with many of the liquids, such as oils, mercury and synthetic compounds heretofore employed because such compounds either have a high vapor pressure and would be gradually lost to the atmosphere and/or they undergo oxidation in the exposed surface.

Therefore, the present process provides a method of heating stills, kettles and vats by heat exchange with a body of the liquid non-hydrolysable organo-silicon compound without substantial loss of oxidation of the compound. Thus, the present process may be used in air heaters, heating coils, stills, jacketed kettles, pipes and shell and tube boilers. In particular, the present compound is adapted to be used in a closed circuit providing one vapor phase. In this embodiment of the process the non-hydrolysable organo-silicon compound is heated at one point in the closed system until the compound is vaporized. The hot vapor is then brought into heat exchange relation in a suitable device where another fluid is added and the organo-silicon compound condenses giving up its heat of vaporization. The condensed liquid is then returned to the original heating unit and revaporized.

By way of illustration but not by way of limiting the invention there will be given the following specific examples:

Example I

A mixture of 50 parts diamyl siloxane and diphenyl oxide is heated and the liquid circulated in a jacket of an evaporating kettle. From the kettle, the material is passed through a heat exchanger where the mixture is reheated.

Example II 75 parts of triamyl silanol and 25 parts of diphenyl is utilized in a closed system of a refrigerating unit.

Example III

A mixture of 60 parts of di (tributyl) silicyl ether and 40 parts of chlorinated diphenyl is used in an open vessel as a bath for heating and evaporating other liquids.

Since certain changes may be made in carrying out the above process without departing from the scope of the invention, it is intended that all matter contained in the above description shall be interpreted as illustrative and not in a limiting sense.

Having described my invention, what I claim as new and desire to secure by Letters Patent is:

1. In a process for heat transfer, the steps comprising heating a fluid consisting essentially of at least one monofluoro alkyl silane in which the sum of the carbon atoms in the alkyl groups exceeds seven and bringing said heated fluid into heat-exchange relation with another material.

2. In a process for heat transfer, the steps comprising heating a fluid consisting essentially of at least one monofluoro alkyl silane in which the sum of the carbon atoms in the alkyl groups exceeds seven and circulating said heated fluid in a closed circuit including a heat-exchanger.

3. In a process for heat transfer, the steps comprising vaporizing a fluid consisting essentially of at least one monofluoro alkyl silane in which the sum of the carbon atoms in the alkyl groups exceeds seven, bringing the vapor into heat-exchange relation with another material whereby the vapor is condensed, withdrawing the condensate and revaporizing it.

4. In a process for heat transfer, the steps comprising cooling a fluid consisting essentially of at least one monofluoro alkyl silane in which the sum of the carbon atoms in the alkyl groups exceeds seven, and bringing said cold fluid into heat-exchange relation with another material.

5. The method for effecting the transfer of heat which comprises bringing into heat-exchange relation with another material a homogeneous fluid which consists essentially of at least one monofluoro alkyl silane in which the sum of the carbon atoms in the alkyl groups exceeds 7.

FRANK J. SOWA.

REFERENCES CITED

The following references are of record in the file of this patent:

UNITED STATES PATENTS

| Number | Name | Date |
|---|---|---|
| 2,007,007 | Snell | July 2, 1935 |
| 2,185,639 | Levine et al. | Jan. 2, 1940 |
| 2,248,494 | Dreisbach et al. | July 8, 1941 |
| 2,335,012 | Johnson | Nov. 23, 1943 |
| 2,384,384 | McGregor et al. | Sept. 4, 1945 |
| 2,397,727 | Daudt | Apr. 2, 1946 |
| 2,413,513 | Morrill | Dec. 31, 1946 |

OTHER REFERENCES

Gierut et al.: in Jour. Am. Chem. Soc. (1936), vol. 58.

Flood: in Jour. Am. Chem. Soc. (1933), vol. 55.

Certificate of Correction

Patent No. 2,515,672 — July 18, 1950

FRANK J. SOWA

It is hereby certified that error appears in the printed specification of the above numbered patent requiring correction as follows:

Column 1, line 41, for the word "disadvantage" read *disadvantages*; line 42, for "objects" read *object*; line 49, for "tht" read *the*; column 2, line 14, for "group" read *groups*; line 24, strike out "difluoro diamyl silane";

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*